United States Patent [19]

Wertlake et al.

[11] 3,862,300

[45] Jan. 21, 1975

[54] HISTOLOGICAL FIXATIVE

[75] Inventors: Paul T. Wertlake, Short Hills; James S. Harrison, Ringwood, both of N.J.

[73] Assignee: Applied Bioscience, Paterson, N.J.

[22] Filed: Mar. 7, 1973

[21] Appl. No.: 338,732

[52] U.S. Cl. .................................. 424/3, 424/75
[51] Int. Cl. ........................ G01n 1/28, G01n 1/30
[58] Field of Search .................. 424/3, 67, 75, 145

[56] References Cited
UNITED STATES PATENTS

| | | | |
|---|---|---|---|
| 730,231 | 6/1903 | Busch | 424/145 |
| 2,304,308 | 12/1942 | Hurd | 424/145 |
| 2,344,830 | 3/1944 | Mohs | 424/3 |

FOREIGN PATENTS OR APPLICATIONS

| | | | |
|---|---|---|---|
| 1,319,393 | 1/1963 | France | 424/3 |

OTHER PUBLICATIONS

Emmel & Cowdry, Lab. Tech. in Biol. & Med., Robt. E. Krieger Pub., N.Y., Fascimile of 4th Ed., 1964, 1970 pp.
Gray, Handbook of Basic Microtech., 3rd Ed., 1964, McGraw-Hill, N.Y., 1964, pp. 85–96.
Lillie, Histopath. Tech. & Pract. Histochom., McGraw-Hill, N.Y., 3rd Ed., 1965, pp. 34–39, 41–43, 45–52.
Cowdry, Lab. Tech. in Biol. & Med, Williams & Wilkins Co., Balti., 1948, pp. 269.

*Primary Examiner*—Albert T. Meyers
*Assistant Examiner*—A. P. Fagelson

[57] ABSTRACT

A superior histological fixative is described comprising trichloroacetic acid, zinc chloride and formaldehyde in an aqueous alcoholic solution.

8 Claims, No Drawings

HISTOLOGICAL FIXATIVE

DETAILED DESCRIPTION

The present invention pertains to a histological fixative for use in preparing tissue specimens for microscopic examination. In the microscopic and histochemical study of tissues, it is a common practice to fix the tissue prior to subjecting the tissue to sectioning by microtomy. Various methods of fixation have been employed depending upon the particular investigation being conducted. Freezing the tissue or embedding it in wax is often sufficient but materials are liable to be lost, altered or moved within the tissues. Various improvements such as freeze-drying utilizing a vacuum or substitution of ice in the frozen cell by alcohol have been used to avoid these difficulties but are often cumbersome on a large scale. Utilization of chemical fixation techniques can be employed in certain instances but lack a wide applicability.

The present invention pertains to a novel histological fixative which causes minimal damage to the cells of the tissue, is convenient in actual use, and can be employed with a wide variety of tissue types. In particular, the present invention pertains to a solution of trichloroacetic acid, zinc chloride and formaldehyde in an aqueous lower alkanol. The lower alkanol can be any of the well known alcohols having from one to four carbon atoms as for example methanol, ethanol, n-propanol, isopropanol, n-butanol and the various branched butanols. Methanol is highly satisfactory and preferred from the standpoint of economics and solvent power. Although the amounts referred to herein are based upon pure alkanol, it is apparent that alkanols containing various amounts of water can be employed in the formulation of the present fixative, making appropriate adjustments in the volumes of the alkanol and additional water which is added.

The aqueous lower alkanol will have a volume ratio of alkanol to total water of from about 1:1 to about 1:3. A preferred ratio is about 1:1.1 to about 1:1.5.

Dissolved in the aqueous alkanol is a mixture of trichloroacetic acid, zinc chloride and formaldehyde. A ratio of zinc chloride to trichloroacetic acid, on a weight basis, is from about 2:1 to about 4:1. A ratio of 3:1 is highly satisfactory. The ratio of formaldehyde to the trichloroacetic acid is from about 8:1 to about 10:1, a typical ratio being 9:1.

The trichloroacetic acid, zinc chloride and formaldehyde are combined and the mixture is then dissolved in the aqueous lower alkanol so as to provide a final solution of from about 8 to about 20 % weight/volume of the mixture in the aqueous lower alkanol. In the case of the formaldehyde, it is convenient to utilize a formaldehyde solution, as for example the conventional 37 % formaldehyde solution, and to make appropriate adjustments in the amount of water which is added. A preferred final concentration is about 10 % weight/volume of the trichloroacetic acid, zinc chloride and formaldehyde in the aqueous lower alkanol.

Although the order of mixing the individual components is not critical, this mixing is accompanied by an exothermic reaction and some care should thus be taken in this preparation. Moreover, since a small amount of insoluble material can be observed in the final solution, it is desirable to filter the solution once the components have been mixed.

The manner of utilizing this histological fixative is identical with that previously employed with known chemical fixatives. Thus the tissue to be examined is simply immersed in the fixative for a short period of time, as for example 1 or 2 hours, and then removed and processed in the usual fashion. Tissue which is so fixed provides excellent specimens upon sectioning. This is true even with such tissue as renal and brain tissue from which specimens are known to be difficult to prepare.

The following example will demonstrate a typical histological fixative according to the present invention, it being appreciated that the amounts of the various components can be varied within the disclosed ranges.

EXAMPLE

Four hundred grams of zinc chloride are combined with 120 grams of trichloroacetic acid and 2.64 liters of 37% formaldehyde (corresponding to 1,055 grams of 100% formaldehyde) in 7.3 liters of 95% methanol (corresponding to 7 liters of 100% methanol) and 7 liters of water. A slight exothermic reaction occurs and after the solution has reattained room temperature, it is filtered and containerized. This solution, which is ready for use as a tissue fixative, corresponds to a 9.8% wt/vol. solution of trichloroacetic acid, zinc chloride and formaldehyde wherein the weight ratio of zinc chloride to trichloroacetic acid is about 3.33:1 and the weight ratio of formaldehyde to trichloroacetic acid is about 9:1, in an aqueous methanol wherein the volume ratio of alkanol to total water (including that added separately, that contained in the 95% methanol and that contained in the 37% formaldehyde) is about 1:1.3.

The histological fixatives of the present invention demonstrate excellent diffusion properties in effecting fixation and lysis yet leave the fixed tissue soft and pliable.

What is claimed is:

1. A histological fixative comprising an 8 to 20% wt/vol solution of a mixture of trichloroacetic acid, zinc chloride and formaldehyde wherein the weight ratio of zinc chloride to trichloroacetic acid is from about 2:1 to about 4:1 and the weight ratio of formaldehyde to trichloroacetic acid is from about 8:1 to about 10:1, in an aqueous lower alkanol wherein the volume ratio of alkanol to total water is from about 1:1 to about 1:3.

2. The histological fixative of claim 1 wherein the lower alkanol is methanol.

3. The histological fixative of claim 1 wherein the ratio of zinc chloride to trichloroacetic acid is from about 3:1 to about 3.5:1.

4. The histological fixative of claim 1 wherein the weight ratio of formaldehyde to trichloroacetic acid is about 9:1.

5. The histological fixative of claim 1 wherein the lower alkanol is methanol and the volume ratio of methanol to water is from about 1:1.1 to about 1:1.5.

6. The histological fixative of claim 1 wherein the concentration of said solution is from about 9 to 11% wt/vol.

7. The histological fixative of claim 1 comprising a 9 to 11% solution wt/vol of a mixture of trichloroacetic acid, zinc chloride and formaldehyde wherein the weight ratio of zinc chloride to trichloriacetic acid is from about 3:1 to about 3.5:1 and the weight ratio of formaldehyde to trichloroacetic acid is from about 8:1 to about 10:1, in aqueous methanol wherein the volume ratio of methanol to total water is from about 1:1.1 to about 1:1.5.

8. The histological fixative of claim 1 consisting essentially of a 9.8 wt/vol solution of a mixture of 3.3 parts of trichloroacetic acid to 1 part of zinc chloride and 9 parts of formaldehyde in aqueous methanol wherein the volume ratio of methanol to total water is about 1:1.3.

* * * * *